UNITED STATES PATENT OFFICE.

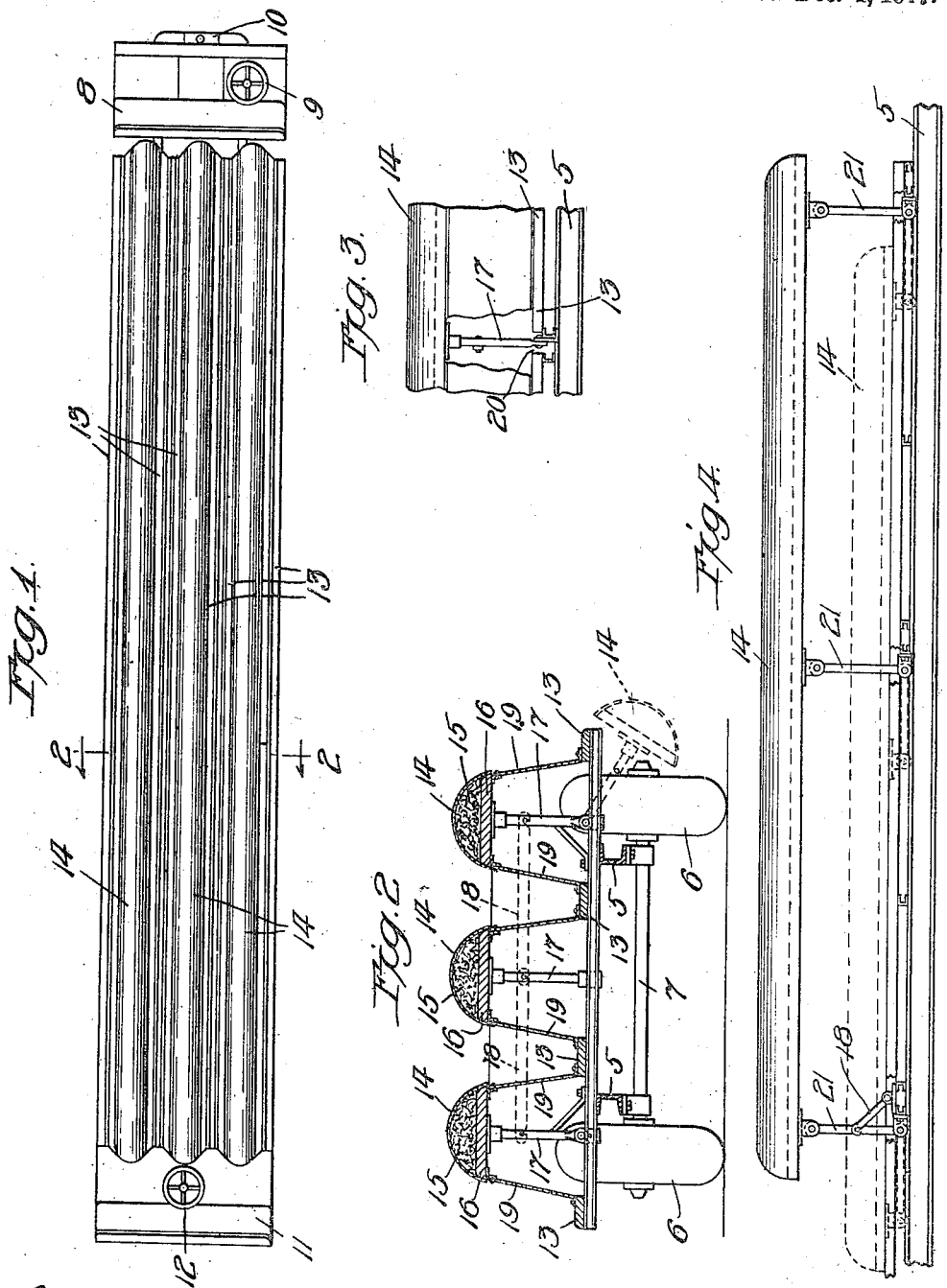

CHARLES P. LANDES, OF CHICAGO, ILLINOIS.

VEHICLE.

1,249,123.

Specification of Letters Patent.     Patented Dec. 4, 1917.

Application filed March 7, 1916.   Serial No. 82,567.

*To all whom it may concern:*

Be it known that I, CHARLES P. LANDES, a citizen of the United States, residing at Chicago, in the county of Cook and State of Illinois, have invented certain new and useful Improvements in Vehicles, of which the following is a specification.

This invention relates to a vehicle adapted particularly for military purposes, being designed with special reference to the transportation of a large body of men at one time.

In modern warfare mobility is recognized to be of prime importance. Various means are now employed to transport troops from one point to another, such, for instance, as railroad trains and automobiles. Transportation via railroad is limited of course to only those points served by the line. Vehicles that travel upon the highways, while operable over any passable road, are nevertheless so limited in carrying capacity as to provide insufficient mobile service. Bearing in mind the great necessity for speedy transportation of large bodies of men to any desired point, I have devised a vehicle, preferably motor-driven, which overcomes the deficiencies inherent in other means of transportation now used. It is a primary object of my invention, therefore, to provide a vehicle having a large carrying capacity, and which is simple and comparatively inexpensive to construct. It is also an object to so construct the vehicle as to render easy and speedy mounting and dismounting of troops, to the end that there may be no unnecessary delays. My invention also contemplates other objects and uses, as will more fully hereinafter appear.

In the accompanying drawing which illustrates one embodiment of my invention—

Figure 1 is a plan view of the vehicle;

Fig. 2 is a cross sectional view on line 2—2 of Fig. 1;

Fig. 3 is a fragmentary side elevation of one of the supports for the riding rails; and Fig. 4 is a fragmentary side elevation of a modified form of riding rail.

In the vehicle construction exhibited, I utilize a motor vehicle having the chassis 5 supported upon wheels and axles 6 and 7 respectively. The vehicle is generally elongated in form, with the length considerably exceeding its width. At the forward end of the vehicle, the driver's seat 8 is provided, the usual steering wheel and controls 9 being located conveniently thereto. The motor is situated within a housing 10, which, in the construction shown, extends partially beneath the driver's seat. At the rear end of the vehicle, another operating seat 11 is located in proximity to a steering wheel 12 for the rear wheels (not shown). The purpose of this rear steering device, of course, is to facilitate turning of the vehicle around sharp corners, an expedient which is commonly used in especially long vehicles.

Arranged upon the chassis of the vehicle and preferably extending from end to end thereof, are a series of foot rails 13, spaced from each other a suitable distance apart. These foot rails are shown as four in number, but this number is capable of modification, if required. Between the foot rails 13 I have arranged riding rails 14 suitably padded or cushioned as at 15, these riding rails being built upon elongated beams 16 supported upon posts 17. The outermost riding rails are supported upon posts 17 which are arranged to swing laterally when desired, for the purpose of lowering such outermost rails to the position indicated by the dotted lines in Fig. 2. To lock the outer riding rails in vertical position, I contemplate the use of suitable links 18, or any other equivalent means. Strips of canvas or other flexible material 19 may be buttoned in place between the foot and riding rails, in the manner shown in Fig. 2. Obviously such covering material should be detachably secured in place, as otherwise the riding rails would not be capable of swinging outwardly in the manner illustrated. In Fig. 3 I have shown an opening 20 in one of the outside foot rails 13 at the points where the supporting posts 17 are situated. This is to enable the posts to swing below the rail, so that the riding rail may be brought to the lowest possible elevation.

In Fig. 4 I have shown a modified construction of the supporting posts for the outer riding rails. In this figure the posts 21 are arranged to swing in a direction longitudinally of the vehicle as distinguished from the laterally swinging posts shown in Fig. 2. The riding rails when lowered would occupy positions similar to that indicated by the dotted lines in Fig. 4.

It will be readily understood from the foregoing description how the vehicle of my invention is intended to be used. At the time troops are to be transported, the outer riding rails are first lowered to remove obstruction for those mounting the center riding rail. The outer riding rails are thereafter raised and locked in position to be available for use. Each man will straddle one riding rail with his feet upon the adjacent foot rails. This enables a large number of men to be safely carried one behind the other on the vehicle to any desired destination reached by passable highways. At the time of dismounting, the outside riding rails may be lowered to enable those on the central riding rail to leave the vehicle with greater despatch.

It will be observed that in the construction which I have provided, a large number of troops can be seated upon a comparatively small vehicle body. The construction of the vehicle is both simple, and possessed of ample strength. Ventilation between the riding rails is provided in the open construction between the foot rails. The canvas strips may be buttoned in place when desired to protect the troops from mud or dust which may be encountered on the road. Other attachments, if desired, such as a canopy, may also be provided. Such additions to the construction which I have shown are entirely obvious, and may be used as circumstances permit. It is manifest also that other equivalent means for lowering and raising the riding rails may be substituted for those which I have shown, but such modifications are comprehended within the scope of my invention.

I claim:

1. In combination with a vehicle chassis, riding rails arranged in courses upon the chassis and spaced apart for each to be straddled, and foot rails on each side of each riding rail, the spaces between the foot rails being open, substantially as described.

2. In combination with a vehicle chassis, riding rails arranged in courses upon the chassis and spaced apart for each to be straddled, foot rails on each side of each riding rail, the spaces between the foot rails being open, and means for lowering the outermost of the riding rails, substantially as described.

3. In a vehicle of the kind described, the combination with a chassis of straddling seats mounted directly on the chassis arranged in courses thereupon with the seats suitably elevated and spaced apart, and foot rails mounted directly on the chassis on each side of the straddling seats and at a distance therebelow, substantially as described.

4. In a vehicle of the kind described, the combination with a chassis of straddling seats mounted directly on the chassis arranged in courses thereupon with the seats suitably elevated and spaced apart, and foot rails mounted directly on the chassis on each side of the straddling seats and at a distance therebelow, the spaces between the foot rails being open, substantially as described.

5. In a vehicle of the kind described, the combination with a chassis of straddling seats arranged in courses upon the chassis, foot rails on the chassis on either side of the straddling seats, and supports for the seats mounted directly on the chassis and adapted to lower the seats when desired, substantially as described.

CHARLES P. LANDES.

Witnesses:
FRANCES M. FROST,
EPHRAIM BANNING.

Copies of this patent may be obtained for five cents each, by addressing the "Commissioner of Patents, Washington, D. C."